United States Patent
Hasegawa et al.

(10) Patent No.: US 11,634,065 B2
(45) Date of Patent: Apr. 25, 2023

(54) CONTROL METHOD AND CONTROL DEVICE

(71) Applicant: Panasonic Intellectual Property Management Co., Ltd., Osaka (JP)

(72) Inventors: Takao Hasegawa, Hyogo (JP); Daisuke Iwahashi, Osaka (JP); Hiroki Monta, Osaka (JP); Rumi Ohnishi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/668,916

(22) Filed: Feb. 10, 2022

(65) Prior Publication Data
US 2022/0305981 A1 Sep. 29, 2022

(30) Foreign Application Priority Data
Mar. 23, 2021 (JP) .............................. JP2021-049100

(51) Int. Cl.
  *B60Q 1/14* (2006.01)
  *H05B 47/105* (2020.01)
  *B60W 60/00* (2020.01)

(52) U.S. Cl.
  CPC ........... *B60Q 1/143* (2013.01); *H05B 47/105* (2020.01); *B60Q 2300/054* (2013.01); *B60W 60/005* (2020.02)

(58) Field of Classification Search
  CPC ... H05B 47/17; H05B 47/105; B60W 60/005; B60Q 2300/054; B60Q 1/143
  See application file for complete search history.

(56) References Cited

U.S. PATENT DOCUMENTS

| 2013/0051042 A1* | 2/2013 | Nordbruch ............. B60Q 1/085 362/466 |
| 2018/0134207 A1* | 5/2018 | Kentley-Klay ...... G05D 1/0248 |
| 2021/0178959 A1* | 6/2021 | Ishida ................... F21S 41/675 |

FOREIGN PATENT DOCUMENTS

| JP | 2005-176031 | 6/2005 |
| JP | 2005176031 A * | 6/2005 |

(Continued)

OTHER PUBLICATIONS

Office Action from Japan Patent Office (JPO) in Japanese Patent Appl. No. 2021-049100, dated Jan. 31, 2023, together with an English language translation.

*Primary Examiner* — Raymond R Chai
(74) *Attorney, Agent, or Firm* — Greenblum & Bernstein, P.L.C.

(57) ABSTRACT

A control method according to the present disclosure includes: obtaining (receiving) position information (a danger warning signal) indicating a target position where a target object is present; determining whether the vehicle is driving autonomously or is being driven manually; when the vehicle is determined to be being driven manually, inspecting whether the target position is located within a predetermined region of a travel route of the vehicle based on the position information; when the target position is located within the predetermined region, changing the light transmission state of the headlight from a first state to a second state; and when the vehicle is determined to be driving autonomously and/or the target position is not located within the predetermined region, maintaining the light transmission state of the headlight.

8 Claims, 4 Drawing Sheets

(56) References Cited

FOREIGN PATENT DOCUMENTS

| JP | 6091801 | 3/2017 |
|----|---------|--------|
| JP | 2020-026199 | 2/2020 |

\* cited by examiner

CONTROL METHOD AND CONTROL DEVICE

CROSS REFERENCE TO RELATED APPLICATION

The present application is based on and claims priority of Japanese Patent Application No. 2021-049100 filed on Mar. 23, 2021.

Field

The present disclosure relates to a control method and a control device for a headlight provided in a vehicle.

Background

A method of controlling the light transmission state of a headlight provided in a vehicle (and specifically, the state of light emitted by the headlight) has been proposed in the past (see PTL 1, for example). With the method disclosed in PTL 1, when a danger warning signal indicating a danger position where an object posing a danger to the vehicle is received, the light transmission state of the headlight is controlled based on the danger warning signal received. This makes it possible to notify the driver that an obstruction which obstructs the travel route is present using the light transmission state of the headlight.

CITATION LIST

Patent Literature

PTL 1: Japanese Patent No. 6091801

SUMMARY

However, the method disclosed in the aforementioned PTL 1 can be improved upon.

In view of this, the present disclosure provides a control method and the like capable of further improving upon the related art.

A control method according to one aspect of the present disclosure is a control method that controls a light transmission state of a headlight provided in a vehicle capable of driving autonomously and being driven manually. The control method includes: obtaining position information indicating a target position where a target object is present; determining whether the vehicle is driving autonomously or is being driven manually; when the vehicle is determined to be being driven manually, inspecting whether the target position is located within a predetermined region of a travel route of the vehicle based on the position information; when the target position is located within the predetermined region, changing the light transmission state of the headlight from a first state to a second state; and when the vehicle is determined to be driving autonomously and/or the target position is not located within the predetermined region, maintaining the light transmission state of the headlight.

A control device according to one aspect of the present disclosure is a control device that controls a light transmission state of a headlight provided in a vehicle capable of driving autonomously and being driven manually. The control device includes: an obtainer that obtains position information indicating a target position where a target object is present; a determiner that determines whether the vehicle is driving autonomously or is being driven manually; an inspector that, when the determiner determines that the vehicle is being driven manually, inspects whether the target position is located within a predetermined region of a travel route of the vehicle based on the position information; and a controller that, when the target position is located within the predetermined region, changes the light transmission state of the headlight from a first state to a second state, and when the vehicle is determined to be driving autonomously and/or the target position is not located within the predetermined region, maintains the light transmission state of the headlight.

Note that these comprehensive or specific aspects may be realized by a system, a method, an integrated circuit, a computer program, or a computer-readable recording medium such as a CD-ROM, or may be implemented by any desired combination of systems, devices, methods, integrated circuits, computer programs, and recording media.

The control method and the like according to one aspect of the present disclosure are capable of further improving upon the related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENTS

A control method according to one aspect of the present disclosure is a control method that controls a light transmission state of a headlight provided in a vehicle capable of driving autonomously and being driven manually. The control method includes: obtaining position information indicating a target position where a target object is present; determining whether the vehicle is driving autonomously or is being driven manually; when the vehicle is determined to be being driven manually, inspecting whether the target position is located within a predetermined region of a travel route of the vehicle based on the position information; when the target position is located within the predetermined region, changing the light transmission state of the headlight from a first state to a second state; and when the vehicle is determined to be driving autonomously and/or the target position is not located within the predetermined region, maintaining the light transmission state of the headlight.

When controlling the light transmission state of the headlight, if the light transmission state is changed too much, there is a problem in that pedestrians and the drivers of other vehicles are needlessly blinded, energy is needlessly consumed by the headlight, and the like. Therefore, it is desirable for the control of the light transmission state of the headlight to change at appropriate times. With the control method according to one aspect of the present disclosure, the driver can be notified that an obstruction is located in the travel route by controlling the light transmission state of the headlight appropriately when the vehicle is being driven manually. Additionally, when the vehicle is driving autonomously, the driver is not controlling the driving of the vehicle, and it is therefore not necessary to notify the driver that an obstruction is located in the travel route. Accordingly, with a control method according to one embodiment of the present disclosure, when the vehicle is driving autonomously, the light transmission state of the headlight is not changed. In this manner, not changing the light transmission state of the headlight when it is not necessary to communicate information to the driver based on the light transmission state of the headlight makes it possible to suppress needless changes in the light transmission state of the headlight. This makes it possible to suppress situations in which pedestrians and the drivers of other vehicles are needlessly blinded, energy is needlessly consumed by the headlight, and the like.

Additionally, a control method according to one aspect of the present disclosure further includes: determining whether the position information is reliable; performing the inspecting when the vehicle is determined to be being driven manually and the position information is determined to be reliable; and maintaining the light transmission state of the headlight when the vehicle is determined to be being driven manually and the position information is determined to be unreliable.

For example, when the position information is obtained from an external device such as a server device, it is possible that the position information is transmitted from an unreliable device. Alternatively, for example, if the position information is obtained from a sensor or the like, it is possible that the sensor has made a false detection. Accordingly, determining whether the position information is reliable makes it possible to suppress needless changes in the light transmission state of the headlight even in such cases.

Additionally, whether the vehicle is driving autonomously or is being driven manually may be determined, and when the vehicle is determined to be being driven manually, whether the position information is reliable may be determined.

This makes it possible to reduce the amount of processing involved in controlling the transmission of light by the headlight.

Additionally, the control of the light transmission state may be control of at least one of a light intensity or a region in which light transmitted by the headlight is emitted.

Through this, when controlling the transmission of light by the headlight, situations in which pedestrians and the drivers of other vehicles are needlessly blinded, energy is needlessly consumed by the headlight, and the like can be suppressed.

Additionally, a program according to one aspect of the present disclosure is a program that causes a computer to execute the control method according to one aspect of the present disclosure.

This provides the same effects as the above-described control method.

A control device according to one aspect of the present disclosure is a control device that controls a light transmission state of a headlight provided in a vehicle capable of driving autonomously and being driven manually. The control device includes: an obtainer that obtains position information indicating a target position where a target object is present; a determiner that determines whether the vehicle is driving autonomously or is being driven manually; an inspector that, when the determiner determines that the vehicle is being driven manually, inspects whether the target position is located within a predetermined region of a travel route of the vehicle based on the position information; and a controller that, when the target position is located within the predetermined region, changes the light transmission state of the headlight from a first state to a second state, and when the vehicle is determined to be driving autonomously and/or the target position is not located within the predetermined region, maintains the light transmission state of the headlight.

This provides the same effects as the above-described control method.

Note that these comprehensive or specific aspects may be realized by a system, a method, an integrated circuit, a computer program, or a computer-readable recording medium such as a CD-ROM, or may be implemented by any desired combination of systems, devices, methods, integrated circuits, computer programs, or recording media.

Embodiments will be described in detail hereinafter with reference to the drawings.

Note that the following embodiments describe comprehensive or specific examples of the present disclosure. The numerical values, shapes, materials, constituent elements, arrangements and connection states of constituent elements, steps, orders of steps, and the like in the following embodiments are merely examples, and are not intended to limit the present disclosure. Additionally, of the constituent elements in the following embodiments, constituent elements not denoted in the independent claims, which express the broadest interpretation, will be described as optional constituent elements. Additionally, the drawings are schematic diagrams, and are not necessarily exact illustrations. In the drawings, constituent elements which are the same are given the same reference signs.

Embodiment 1

Configuration

Figure 1:
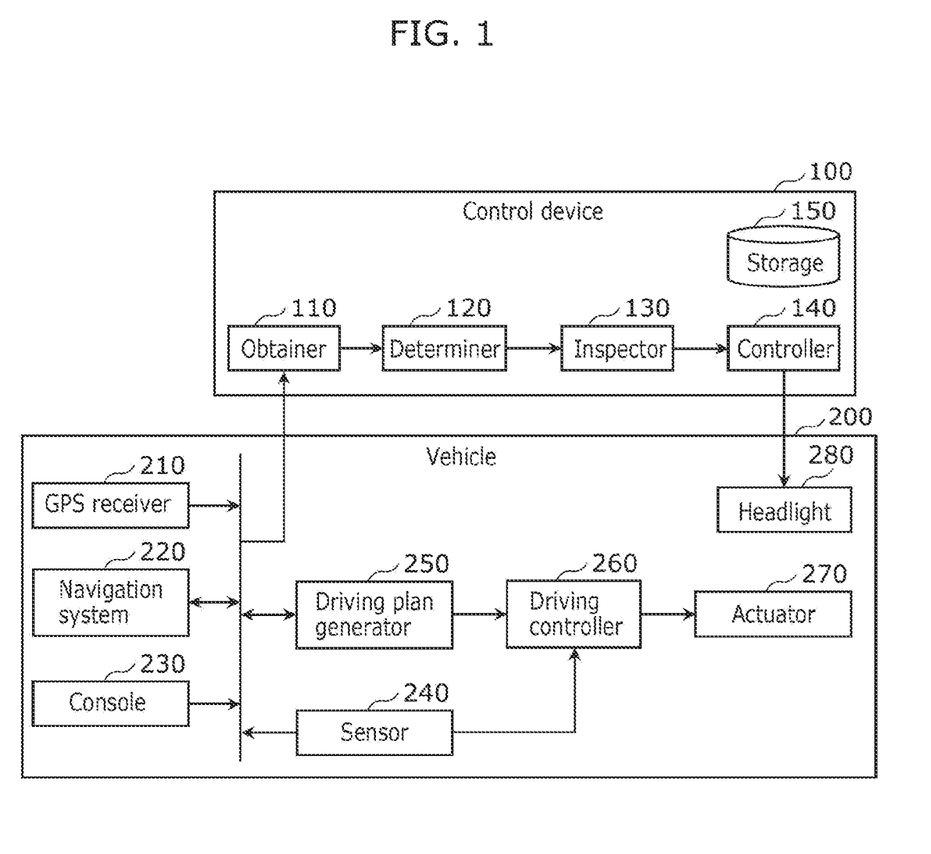
FIG. 1 is a block diagram illustrating the configuration of a control device according to Embodiment 1.

FIG. 1 is a block diagram illustrating the configuration of control device 100 according to Embodiment 1.

Control device 100 is a device that controls headlight 280 provided in vehicle (autonomous driving vehicle) 200.

Vehicle 200 is a vehicle capable of driving autonomously. Vehicle 200 is, for example, a vehicle functioning at at least a predetermined autonomous driving level and that can drive autonomously without requiring driver operations. For example, autonomous driving levels (driving modes) currently under consideration are categorized from Level 0 to Level 5. An autonomous driving level of Level 0 is, for example, a state in which the driver always performs all driving operations (e.g., operations related to driving control, such as acceleration, steering, and the like). An autonomous driving level of Level 1 is a state in which vehicle 200 assists with some of the driving operations performed by the driver. An autonomous driving level of Level 2 is, for example, a state in which vehicle 200 performs some of the driving operations and the driver performs the rest. An autonomous driving level of Level 3 is, for example, a state in which vehicle 200 performs all driving operations except in emergencies, such as states where it is difficult for vehicle 200 to drive autonomously. An autonomous driving level of Level 4 is, for example, a state in which vehicle 200 performs all driving operations, such as stopping at a safe place in emergencies. An autonomous driving level of Level 5 is, for example, a state in which an autonomous driving vehicle performs all driving operations at all times.

The predetermined level which is the autonomous driving level of vehicle 200 is, for example, Level 3 or higher. In other words, vehicle 200 is capable of switching between autonomous driving (a state in which vehicle 200 controls the driving) and manual driving (a state in which the driver controls the driving).

Note that the following will describe a driving state in which the driver is performing at least one driving control as manual driving (i.e., the driver is the primary operator), and an operation state in which the driver is not performing any driving controls as autonomous driving (i.e., vehicle 200 is the primary operator).

During automated driving, for example, vehicle 200 drives autonomously by driving plan generator 250 determining a travel route (travel path) based on information obtained from Global Positioning System (GPS) receiver 210, navigation system 220, sensor 240, and the like, and driving controller 260 controlling actuator 270 for steering and the like so as to travel on the travel route determined.

Additionally, vehicle 200 is configured to be capable of being driven by the driver themself (manual driving). For example, vehicle 200 accepts input from the driver via console 230 as to whether to perform autonomous driving or manual driving, or in other words, whether the primary operator should be vehicle 200 or the driver, and switches between autonomous driving and manual driving based on the accepted result. Vehicle 200, for example, controls actuator 270 as described above when driving autonomously, and when being driven manually, supports the driver's driving by not performing the control related to autonomous driving described above, assisting the driver's driving, performing some driving control, and the like.

Vehicle 200 includes GPS receiver 210, navigation system 220, console 230, sensor 240, driving plan generator 250, driving controller 260, actuator 270, and headlight 280.

GPS receiver 210 is a device that receives self-position information indicating a self-position of vehicle 200. GPS receiver 210 has a communication interface such as, for example, an antenna and a wireless communication circuit, and outputs the received self-position information to driving plan generator 250.

Navigation system 220 is a device that notifies the driver of the travel route to be traveled by vehicle 200 and the like. Navigation system 220 has, for example, a wireless communication interface such as an antenna and a wireless communication circuit, and a display device such as a display, receives map information indicating a map of the road on which vehicle 200 travels from an external device, and outputs the received map information to driving plan generator 250. In addition, navigation system 220 receives state information indicating a state of the road on which vehicle 200 is traveling from an external device, which is a computer such as a server device, for example, and outputs the received state information to driving plan generator 250. Navigation system 220, for example, displays a travel route indicated by driving plan information generated by driving plan generator 250 in the display device.

Console 230 is a device for receiving operations from the driver (a user interface). For example, the driver inputs whether to let vehicle 200 drive autonomously or be driven manually by themself by operating console 230. Vehicle 200 (e.g., driving controller 260) switches between autonomous driving and manual driving based on, for example, an input result input to console 230 and/or a result of a determination as to whether autonomous driving is difficult based on detection results from sensor 240. Console 230 is realized using, for example, a touch panel display or the like.

Sensor 240 is a sensor for detecting the environment around vehicle 200 and a travel state and the like of vehicle 200. For example, sensor 240 is realized by various sensors for autonomous driving of vehicle 200, such as a camera for recognizing the lane of the road on which vehicle 200 travels, an obstruction sensor such as an infrared sensor, an electromagnetic sensor, a millimeter wave sensor, or the like for detecting objects (target objects) such as obstructions in the vicinity of vehicle 200, a yaw rate sensor for measuring a yaw rate of vehicle 200, a speed sensor for detecting the speed of vehicle 200, a steering angle sensor for measuring the steering angle of the steering wheel, tires, and so on, and the like. Sensor 240 outputs the detection results to driving plan generator 250 and driving controller 260.

Driving plan generator 250 is a processing unit that determines the travel route to be traveled by vehicle 200 based on the information obtained from GPS receiver 210, navigation system 220, sensor 240, and the like. In other words, driving plan generator 250 is a processing unit that generates information indicating the travel route (driving plan information). driving plan generator 250 outputs the generated driving plan information to driving controller 260. Driving plan generator 250 may output the driving plan information to navigation system 220 to display the travel route in the display device included in navigation system 220.

Additionally, for example, driving plan generator 250 may determine whether or not autonomous driving is difficult based on a detection result from sensor 240. For example, when it is determined that it is difficult for vehicle 200 to drive autonomously while driving autonomously, driving plan generator 250 may, through a display device, a speaker, or the like (not shown) provided in vehicle 200, notify the driver of a switch to manual driving.

Additionally, console 230 and/or driving plan generator 250 may output information indicating whether an autonomous driving vehicle is performing autonomous driving or manual driving (driving state information) to control device 100 (e.g., obtainer 110).

Driving controller 260 is a processing unit that controls actuator 270 to cause vehicle 200 to travel on the travel route indicated by the driving plan information, based on the driving plan information and information obtained from sensor 240 (i.e., the sensor detection results).

The processing units such as driving plan generator 250, driving controller 260, and the like are realized by, for example, Electronic Control Units (ECUs). An ECU is a computer in an electronically-controlled automobile device, and is realized by a processor such as a Central Processing Unit (CPU), memory such as Read-Only Memory (ROM) and Random Access Memory (RAM), an input/output port through which signals are input and output, and the like.

Actuator 270 is a moving part provided in vehicle 200, such as an actuator for controlling an engine, an actuator for controlling a brake, an actuator for controlling steering, and the like.

Headlight 280 is a light source that outputs (transmits) light. Additionally, headlight 280 can switch light transmission states (in other words, light emission characteristics).

The emission characteristics are the output characteristics of the light, and are characteristics indicating at least one of a light intensity and an emission region (emission position, emission range, and the like). The emission characteristics may be characteristics that indicate light color. The emission characteristics may be characteristics that indicate a state of being lighted, flashing, or the like. The emission characteristics may be characteristics that indicate a flashing speed (flashing interval). Headlight 280 is capable of changing at least one of these characteristics. For example, the light transmission state of headlight 280 is controlled by controller 140 when the autonomous driving vehicle is being driven manually.

Note that the number of headlights 280 in vehicle 200 is not particularly limited. Additionally, headlight 280 may be a headlight that outputs a low beam, or a headlight that outputs a high beam.

Control device 100 is a processing device that controls the light transmission state of headlight 280. For example, when vehicle 200 is being driven manually, i.e., when the primary operator of vehicle 200 is the driver, control device 100 performs control for causing the light transmission state of headlight 280 to change when position information indicating the position of an obstruction that obstructs driving (and more specifically, a danger warning signal including that position information) is obtained.

Control device 100 is realized as a computer including, for example, a communication interface for communicating with the constituent elements included in vehicle 200 and the like, non-volatile memory in which programs are stored, volatile memory serving as a temporary storage region for executing the programs, an input/output port for transmitting and receiving signals, a processor that executes the programs, and the like.

Control device 100 includes obtainer 110, determiner 120, inspector 130, controller 140, and storage 150.

Obtainer 110 is a processing unit that obtains information from GPS receiver 210, navigation system 220, console 230, sensor 240, driving plan generator 250, and the like provided in vehicle 200.

Obtainer 110 obtains, for example, driving state information indicating whether the primary operator of vehicle 200 is the driver or vehicle 200, from console 230 and/or driving plan generator 250. Additionally, for example, obtainer 110 obtains the danger warning signal including position information indicating the position of an object (target object) located around vehicle 200 from sensor 240, the position information being a detection result from sensor 240. Additionally, for example, obtainer 110 obtains a danger warning signal received from an external device such as a server device, Vehicle Information and Communication System (VICS; registered trademark), and the like through traffic radio signals, the Internet, or the like via navigation system 220 and/or a communication interface (not shown). Additionally, for example, obtainer 110 obtains the driving plan information generated by driving plan generator 250.

Obtainer 110 outputs the obtained information to determiner 120 and/or inspector 130.

Determiner 120 is a processing unit that determines whether vehicle 200 is driving autonomously or being driven manually. For example, determiner 120 determines whether vehicle 200 is driving autonomously or being driven manually based on the driving state information obtained by obtainer 110. Determiner 120 outputs a result of the determination to inspector 130. For example, when obtainer 110 obtains a danger warning signal including position information indicating the position (a target position) of an object (a target object) such as an obstruction, or information indicating that position information and that an obstruction that will obstruct driving is present (danger warning information), determiner 120 determines the driving state of vehicle 200 (driving autonomously or being driven manually).

Inspector 130 is a processing unit that, when vehicle 200 is determined to be being driven manually, inspects whether or not the target position is located within a predetermined region of the travel route of vehicle 200, based on the position information indicating the target position of the target object.

The predetermined region may be determined as desired in advance, such as within 1 meter, 5 meters, or the like from a virtual line indicating the travel route.

When it is determined that vehicle 200 is being driven manually, inspector 130 inspects (determines) whether or not the target position is located within the aforementioned predetermined range in the travel route of vehicle 200. Based on a result of the inspection, i.e., based on the position information indicating the position of the target object, inspector 130 outputs, to controller 140, information (an inspection result) indicating whether or not the target position indicated by the position information is located within the predetermined region of the travel route of vehicle 200.

Controller 140 is a processing unit that controls the light transmission state of headlight 280. Specifically, controller 140 changes the light transmission state of headlight 280 from a first state to a second state when a target position is located within the predetermined region. On the other hand, controller 140 does not change the light transmission state of headlight 280 when determiner 120 determines that vehicle 200 is driving autonomously and/or when a target position is not located within the predetermined region.

Note that the first state and the second state may be any states as long as they are different, and are not particularly limited.

For example, the light transmission state control may be control of at least one of the light intensity or the emission region of the light from headlight 280. In other words, to change the light transmission state of headlight 280, controller 140 may change at least one of the light intensity of the light output from headlight 280 and the emission region, such as the emission position, the emission range, and the like of the light emitted from headlight 280.

For example, the first state may be a state in which headlight 280 transmits light at a first light intensity, and the second state may be a state in which headlight 280 transmits light at a second light intensity that is higher than the first light intensity. Alternatively, for example, the first state may be a state in which light is transmitted forward in the travel direction of vehicle 200, and the second state may be a state in which light is further transmitted in the direction in which an obstruction is located. Alternatively, for example, the first state may be a lit state, and the second state may be a flashing state. Alternatively, for example, the first state may be a turned-off state, and the second state may be a lit state. Alternatively, for example, the first state may be white light, and the second state may be red light.

In this manner, when vehicle 200 is being driven manually, controller 140 performs control that changes the light transmission state of headlight 280 when an obstruction is present in the travel route.

Each of the processing units of obtainer 110, determiner 120, inspector 130, and controller 140 is realized by, for example, a processor such as a CPU and a control program stored in storage 150 or the like and executed by the CPU.

Storage 150 is a storage device that stores control programs executed by the processing units of control device 100, region information indicating the predetermined region, and the like. Storage 150 is realized by a Hard Disk Drive (HDD), Flash memory, or the like, for example.

Note that control device 100 may be disposed in vehicle 200, or may be disposed outside of vehicle 200.

Additionally, control device 100 may be realized by an ECU included in vehicle 200, along with driving plan generator 250, driving controller 260, and the like.

Additionally, determiner 120 may end the processing without outputting a determination result when it is determined that vehicle 200 is driving autonomously.

Additionally, if it is determined that the target position is within the aforementioned predetermined range in the travel route of vehicle 200, inspector 130 may end the processing without outputting a determination result (inspection result) to controller 140.

Processing Sequence

Figure 2:
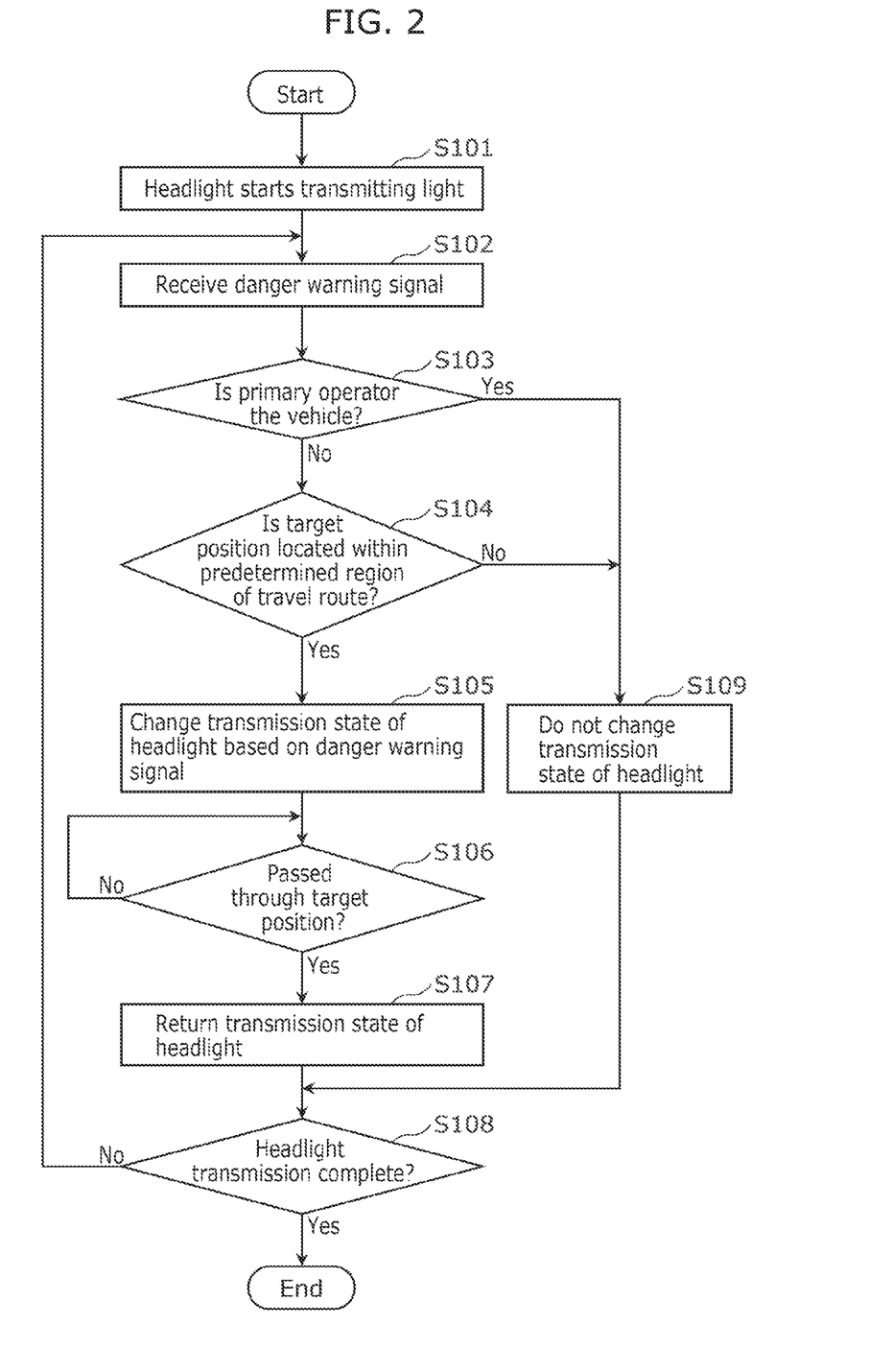
FIG. 2 is a flowchart illustrating a processing sequence of the control device according to Embodiment 1.

FIG. 2 is a flowchart illustrating a processing sequence of control device 100 according to Embodiment 1.

First, vehicle 200 starts light transmission from headlight 280 (S101). For example, by operating vehicle 200, the driver causes headlight 280 to start transmitting light such that the light transmission state of headlight 280 is the first state.

Next, assume that obtainer 110 has received (obtained) the position information indicating the target position where a target object (an obstruction) is present (e.g., a danger warning signal including the position information) from an external device such as a server device or sensor 240 (S102).

Next, determiner 120 determines whether vehicle 200 is driving autonomously or is being driven manually, i.e., whether the primary operator of vehicle 200 is vehicle 200 or the driver (S103). For example, obtainer 110 obtains vehicle state information from console 230 or driving plan generator 250, and determiner 120 determines whether the primary operator of vehicle 200 is the vehicle or the driver based on the vehicle state information obtained by obtainer 110.

If determiner 120 determines that the primary operator of vehicle 200 is the driver (No in S103), inspector 130 performs an inspection, based on the position information, as to whether or not a target position is located within the predetermined region of the travel route of vehicle 200 (S104).

If, based on the position information, a target position is determined to be located within the predetermined region of the travel route of vehicle 200 (Yes in S104), controller 140 causes the light transmission state of headlight 280 to change by controlling headlight 280 based on the position information (e.g., a danger warning signal including the position information (S105). For example, controller 140 changes the light transmission state of headlight 280 from the first state to the second state.

Note that the second state may be a predetermined state, may be determined based on the first state, may be determined based on the position information, or may be determined by information or the like indicating a type of the target object, included in the danger warning signal.

Next, controller 140 determines whether or not vehicle 200 has passed through the target position (S106). For example, based on the position information, the self-position information obtained from GPS receiver 210, and the driving plan information, controller 140 determines whether or not the self-position of vehicle 200 indicated by the self-position information is located further forward than the target position indicated by the position information, in the travel route indicated by the driving plan information, with respect to the travel direction of vehicle 200.

If vehicle 200 is determined not to have passed through the target position (No in S106), controller 140 repeats the determination of step S106. In other words, in this case, controller 140 keeps the light transmission state of headlight 280 in the second state.

On the other hand, if vehicle 200 is determined to have passed through the target position (Yes in S106), controller 140 returns the light transmission state of headlight 280 to the state from before the change made in step S105 (S107). Specifically, controller 140 changes the light transmission state of headlight 280 from the second state to the first state.

Next, controller 140 determines whether or not the transmission of light by headlight 280 is complete (S108). For example, controller 140 determines whether or not headlight 280 has been turned off, such as whether headlight 280 has been turned off by the driver, whether vehicle 200 has stopped and vehicle 200 has turned off headlight 280, or the like.

If the transmission of light by headlight 280 is determined to be complete (Yes in S108), controller 140 ends the processing for controlling the transmission of light by headlight 280, and if the transmission of light by headlight 280 is determined not to be complete (No in S108), controller 140 returns the processing to step S102 and, for example, stands by until obtainer 110 obtains the position information.

Additionally, if determiner 120 determines that the primary operator of vehicle 200 is vehicle 200 (Yes in S103), or determines that the target position is not located within the predetermined region of the travel route of vehicle 200 (No in S104), controller 140 moves the processing to step S108 without changing the light transmission state of headlight 280 (S109). In other words, when a determination of No is made in step S103 or in step S104, controller 140 keeps the light transmission state of headlight 280 in the first state.

Note that step S101 may or may not be executed. In other words, the first state may be the turned-off state. Additionally, if step S101 is not executed, i.e., if the first state is the turned-off state and the processing from step S102 on is executed, step S108 need not be executed.

Additionally, rather than returning the light transmission state from the second state to the first state in step S107, controller 140 may change the light transmission state of headlight 280 to a third state different from the first state and the second state. In some cases, changing the light transmission state of headlight 280 from the second state to the first state may be inappropriate, depending on traffic conditions. In such cases too, controller 140 can suppress the occurrence of problems like glare by changing the light transmission state of headlight 280 as appropriate in accordance with the traffic conditions.

Effects, Etc.

As described thus far, the control method according to Embodiment 1 is a control method that controls a light transmission state of headlight 280 provided in vehicle 200 capable of driving autonomously and being driven manually. The control method includes: obtaining (receiving) position information (the danger warning signal) indicating a target position where a target object is present (S102); determining whether vehicle 200 is driving autonomously or is being driven manually (S103); when vehicle 200 is determined to be being driven manually (No in S103), inspecting whether the target position is located within a predetermined region of a travel route of vehicle 200 based on the position information (S104); when the target position is located within the predetermined region (Yes in S104), changing the light transmission state of headlight 280 from a first state to a second state (S105); and when vehicle 200 is determined to be driving autonomously (Yes in S103) and/or the target position is not located within the predetermined region (No in S104), maintaining the light transmission state of headlight 280 (S109).

Thus far, if the method disclosed in the above-described PTL 1 is applied to vehicle 200 or the like which is capable of autonomous driving, when a danger warning signal including position information or the like is received, the light transmission state of the headlight changes even if the vehicle is driving autonomously. The light transmission state of headlight 280 is changed in order to notify the driver that an obstruction is present, for example. Changing the light transmission state of headlight 280 for this reason is unnecessary control during autonomous driving, when the driver is not driving. As such, with the control method according to Embodiment 1, the driver can be notified that an obstruction is located in the travel route by controlling the light transmission state of headlight 280 appropriately when vehicle 200 is being driven manually. The light transmission state of headlight 280 is not changed when vehicle 200 is driving autonomously. In this manner, not changing the light transmission state of headlight 280 when it is not necessary to communicate information to the driver based on the light transmission state of headlight 280 makes it possible to suppress needless changes in the light transmission state of headlight 280. This makes it possible to suppress situations in which pedestrians and the drivers of other vehicles are needlessly blinded, energy is needlessly consumed by headlight 280, and the like.

Additionally, the light transmission state control may be control of at least one of the light intensity or the emission region of the light from headlight 280.

Through this, when controlling the transmission of light by headlight 280, situations in which pedestrians and the drivers of other vehicles are needlessly blinded, energy is needlessly consumed by headlight 280, and the like can be suppressed.

Additionally, a program according to one aspect of the present disclosure is a program that causes a computer to execute the control method according to one aspect of the present disclosure (Embodiment 1, or Embodiment 2, described later).

This provides the same effects as the above-described control method.

Additionally, control device 100 according to Embodiment 1 is a control device that controls a light transmission state of headlight 280 provided in vehicle 200 capable of driving autonomously and being driven manually, and includes: obtainer 110 that obtains position information indicating a target position where a target object is present; determiner 120 that determines whether vehicle 200 is driving autonomously or is being driven manually; inspector 130 that, when determiner 120 determines that vehicle 200 is being driven manually, inspects whether the target position is located within a predetermined region of a travel route of vehicle 200 based on the position information; and controller 140 that, when the target position is located within the predetermined region, changes the light transmission state of headlight 280 from a first state to a second state, and when vehicle 200 is determined to be driving autonomously and/or the target position is not located within the predetermined region, maintains the light transmission state of headlight 280.

This provides the same effects as the above-described control method.

Embodiment 2

A control device according to Embodiment 2 will be described next. The following descriptions of the control device according to Embodiment 2 will focus on the differences from control device 100 according to Embodiment 1. Configurations which are substantially the same as in control device 100 according to Embodiment 1 will be given the same reference signs, and descriptions thereof may be omitted or simplified.

Figure 3:
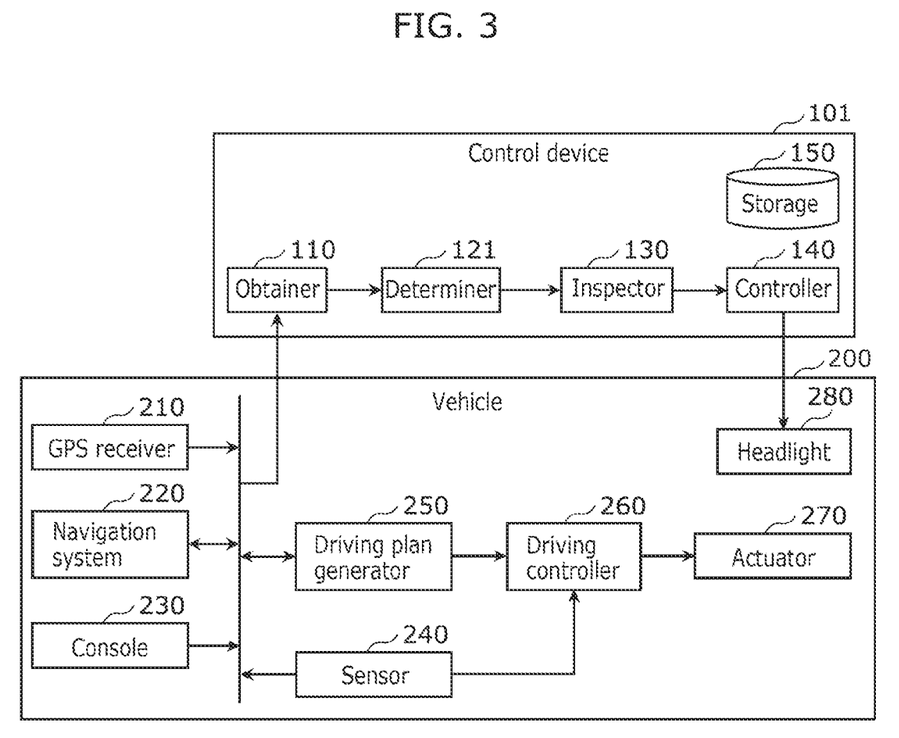
FIG. 3 is a block diagram illustrating the configuration of a control device according to Embodiment 2.

FIG. 3 is a block diagram illustrating the configuration of control device 101 according to Embodiment 2.

Control device 101 is a device that controls headlight 280 provided in vehicle (autonomous driving vehicle) 200.

Control device 101 is realized as a computer including, for example, a communication interface for communicating with the constituent elements included in vehicle 200 and the like, non-volatile memory in which programs are stored, volatile memory serving as a temporary storage region for executing the programs, an input/output port for transmitting and receiving signals, a processor that executes the programs, and the like.

Control device 101 includes obtainer 110, determiner 121, inspector 130, controller 140, and storage 150.

Determiner 121 is a processing unit that determines whether vehicle 200 is driving autonomously or being driven manually. For example, determiner 121 determines whether vehicle 200 is driving autonomously or being driven manually based on the driving state information obtained by obtainer 110. Determiner 121 outputs a result of the determination to inspector 130.

For example, determiner 121 may further determine whether or not the position information is reliable. For example, determiner 121 outputs, to inspector 130, information indicating whether vehicle 200 is driving autonomously or is being driven manually, and information indicating a result of determining the reliability. For example, when determiner 121 determines that vehicle 200 is being driven manually and the position information is reliable, inspector 130 performs an inspection, based on the position information, as to whether or not the target position where the target object is located is within the predetermined region of the travel route of vehicle 200.

On the other hand, inspector 130 does not perform the above-described inspection when determiner 121 determines that vehicle 200 is being driven manually and the position information is unreliable. In other words, in this case, controller 140 does not change the light transmission state of headlight 280.

For example, determiner 121 determines whether vehicle 200 is driving autonomously or is being driven manually, and when vehicle 200 is determined to be being driven manually, further determines whether or not the position information is reliable. For example, determiner 121 outputs, to inspector 130, information indicating a result of determining the reliability. For example, when determiner 121 determines that the position information is reliable, inspector 130 performs an inspection, based on the position information, as to whether or not the target position where the target object is located is within the predetermined region of the travel route of vehicle 200.

On the other hand, when determiner 121 determines that the position information is unreliable, inspector 130 does not execute the stated inspection. In other words, in this case, controller 140 does not change the light transmission state of headlight 280.

Specifically, determiner 121 determines whether vehicle 200 is driving autonomously or is being driven manually, and when vehicle 200 is determined to be being driven manually, further determines the reliability of the position information. For example, determiner 121 outputs, to inspector 130, information indicating a result of determining the reliability. Inspector 130 performs the above-described inspection when the reliability, which is the result of the determination by determiner 121, is at least a predetermined threshold. On the other hand, inspector 130 does not execute the inspection when the reliability, which is the result of the determination by determiner 121, is less than the predetermined threshold. In other words, controller 140 does not change the light transmission state of headlight 280.

Note that any method may be used as the method for determining the reliability. For example, in addition to the position information, the danger warning signal includes type information indicating a type of the target object and motion information indicating motion characteristics. Additionally, storage 150 stores the type of the target object and the motion characteristics in a database in association with each other. Determiner 121 determines, for example, whether or not the type information and motion information included in the danger warning signal obtained by obtainer 110 correspond to the database stored in storage 150. For example, when the target object indicated by the type information is a pedestrian and the speed of the target object indicated by the motion information is 50 km/h, and a maximum speed associated with the pedestrian indicated by the database stored in storage 150 is 10 km/h, determiner 121 determines that the reliability of the danger warning signal (various types of information including position information included in the danger warning signal) is low (e.g., is lower than a predetermined threshold) because there is a difference of 40 km/h in the speed between the motion information and the database (i.e., the danger warning signal is unreliable). On the other hand, when the target object indicated by the type information is a pedestrian and the speed of the target object indicated by the motion information is 5 km/h, and the maximum speed associated with the pedestrian indicated by the database stored in storage 150 is 10 km/h, determiner 121 determines that the reliability of the danger warning signal is high, e.g., is at least the predetermined threshold, because the speeds in the motion information and the database match (i.e., the danger warning signal is reliable).

In this manner, when there is a clear contradiction between the information (attribute values) included in the danger warning signal and the database stored in storage 150, determiner 121 determines that the reliability of the danger warning signal is low.

Alternatively, for example, determiner 120 may determine the reliability of the position information obtained from sensor 240. For example, assume that obtainer 110 obtains position information obtained from a range sensor for detecting the position of the target object, which is an example of sensor 240; image information indicating the target object obtained from an image sensor, which is another example of sensor 240; and speed information indicating a speed of the target object obtained by a speed sensor, which is another example of sensor 240. Determiner 120 may determine that the position information is unreliable when the target object is moving at at least a predetermined speed, and may determine that the position information is reliable when the target object is moving at less than the predetermined speed.

The predetermined threshold may be set as desired. For example, threshold information indicating the predetermined threshold may be stored in storage 150 in advance.

Determiner 121 may determine the reliability as one of two values which are higher or lower than a predetermined threshold, or as one of a plurality of values, such as five levels from 1 to 5. For example, if the predetermined threshold is 2 and determiner 121 determines the reliability in three levels of 1, 2, and 3, controller 140 does not control the light transmission of headlight 280 when inspector 130 determines that the target position where the target object is located is within the predetermined region of the travel route of vehicle 200 and determiner 121 determines that the reliability is 1. Additionally, for example, controller 140 increases the light intensity of headlight 280 when inspector 130 determines that the target position where the target object is located is within the predetermined region of the travel route of vehicle 200 and determiner 121 determines that the reliability is 2. Additionally, for example, controller 140 increases the light intensity of headlight 280 and causes headlight 280 to flash when inspector 130 determines that the target position where the target object is located is within the predetermined region of the travel route of vehicle 200 and determiner 121 determines that the reliability is 3. In this manner, controller 140 may change the light transmission state of headlight 280 based on the reliability determined by determiner 121.

Each of the processing units of obtainer 110, determiner 121, inspector 130, and controller 140 is realized by, for example, a processor such as a CPU and a control program stored in storage 150 or the like and executed by the CPU.

Note that control device 101 may be disposed in vehicle 200, or may be disposed outside of vehicle 200.

Additionally, control device 101 may be realized by an ECU included in vehicle 200, along with driving plan generator 250, driving controller 260, and the like.

Additionally, determiner 121 may end the processing without outputting a determination result when it is determined that vehicle 200 is driving autonomously.

Figure 4:
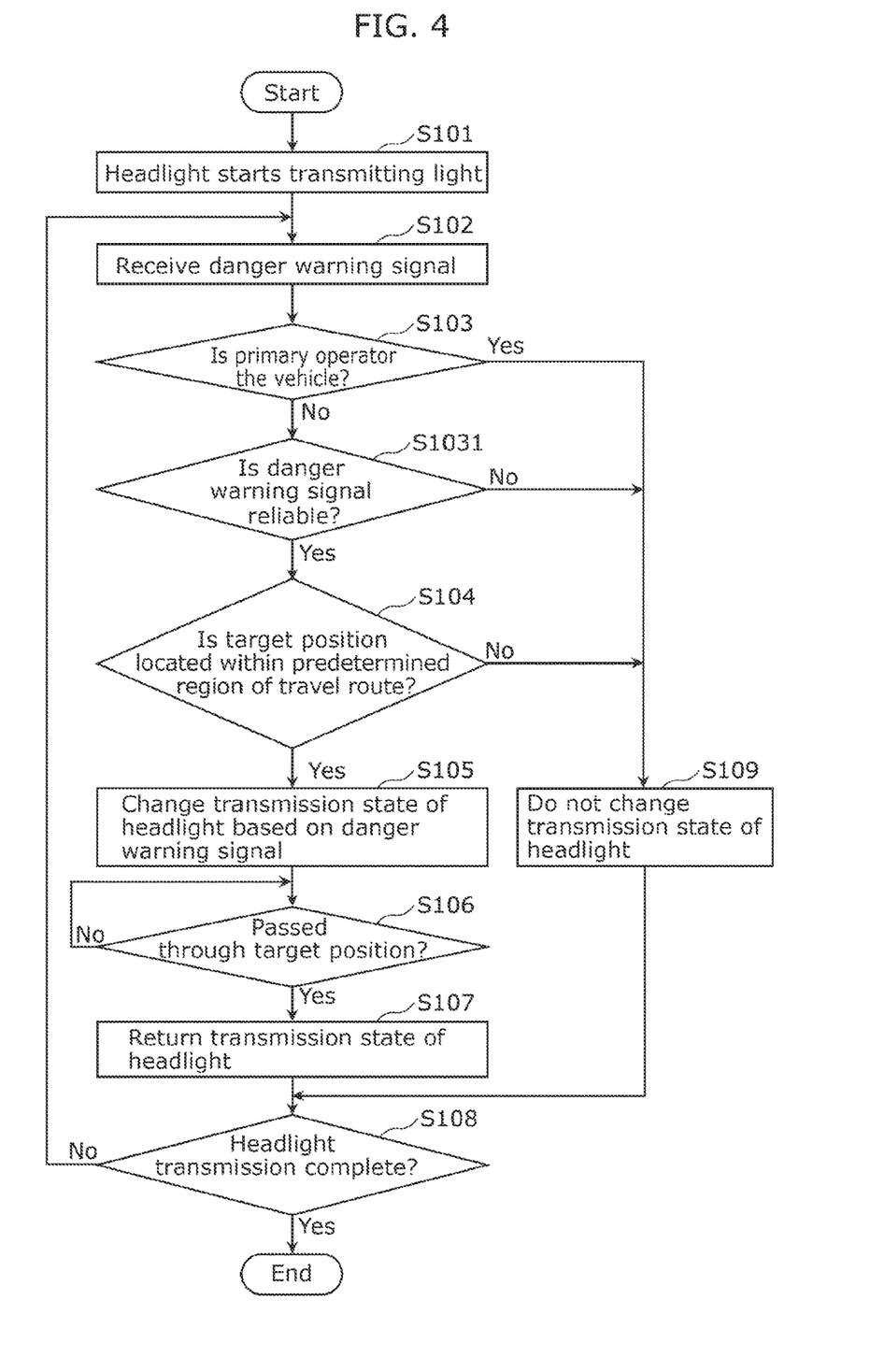
FIG. 4 is a flowchart illustrating a processing sequence of the control device according to Embodiment 2.

FIG. 4 is a flowchart illustrating a processing sequence of control device 101 according to Embodiment 2.

First, vehicle 200 and control device 101 execute the above-described steps S101 to S103.

When a determination of No is made in step S103, determiner 121 further determines whether or not the danger warning signal (and specifically, the various types of information, such as the position information, included in the danger warning signal) is reliable (S1031).

If the danger warning signal is determined to be reliable (Yes in S1031), determiner 121 performs the processing from the above-described step S104 on.

On the other hand, if determiner 121 determines that the danger warning signal is unreliable (No in S1031), controller 140 executes the above-described step S109.

As described thus far, like the control method according to Embodiment 1, the control method according to Embodiment 2 is a control method that controls a light transmission state of headlight 280 provided in vehicle 200 capable of driving autonomously and being driven manually. Like the control method according to Embodiment 1, the control method includes: obtaining (receiving) position information (the danger warning signal) indicating a target position where a target object is present (S102); determining whether vehicle 200 is driving autonomously or is being driven manually (S103); when vehicle 200 is determined to be being driven manually (No in S103), inspecting whether the target position is located within a predetermined region of a travel route of vehicle 200 based on the position information (S104); when the target position is located within the predetermined region (Yes in S104), changing the light transmission state of headlight 280 from a first state to a second state (S105); and when vehicle 200 is determined to be driving autonomously (Yes in S103) and/or the target position is not located within the predetermined region (No in S104), maintaining the light transmission state of headlight 280 (S109). Here, in the control method according to Embodiment 2, when a determination of Yes is made in step S103, it is further determined whether or not the position information is reliable (S1031). Furthermore, if it is determined that vehicle 200 is being driven manually (No in S103) and the position information is determined to be reliable (Yes in S1031), the above-described inspection is performed, whereas if it is determined that vehicle 200 is being driven manually (No in S103) and the position information is determined to be unreliable (No in S1031), the light transmission state of headlight 280 is not changed.

For example, when the position information is obtained from an external device such as a server device, it is possible that the position information is transmitted from an unreliable device. Alternatively, for example, if the position information is obtained from sensor 240 or the like, it is possible that sensor 240 has made a false detection. Accordingly, determining whether or not the position information is reliable makes it possible to suppress needless changes in the light transmission state of headlight 280 even in such cases.

Additionally, in the control method according to Embodiment 2, whether vehicle 200 is driving autonomously or is being driven manually may be determined, and when vehicle 200 is determined to be being driven manually, whether or not the position information is reliable may be further determined.

This makes it possible to reduce the amount of processing involved in controlling the transmission of light by headlight 280.

When the position information is determined to be reliable (Yes in S1031), the above-described inspection is performed (S104), whereas when the position information is determined to be unreliable (No in S1031), the light transmission state of headlight 280 is not changed (S109).

For example, when the position information is obtained from an external device such as a server device, it is possible that the position information is transmitted from an unreliable device. Alternatively, for example, if the position information is obtained from sensor 240 or the like, it is possible that sensor 240 has made a false detection. Accordingly, determining whether or not the position information is reliable makes it possible to suppress needless changes in the light transmission state of headlight 280 even in such cases.

Other Embodiments

Although one or more aspects of a control method, a program, and a control device have been described thus far based on embodiments, the present disclosure is not intended to be limited to the above-described embodiments. Various conceivable variations made on the embodiments by one skilled in the art also fall within the scope of the present disclosure as long as those variations do not depart from the essential spirit of the present disclosure.

For example, in the foregoing embodiments, the constituent elements are constituted by dedicated hardware. However, the constituent elements may be realized by executing software programs corresponding to those constituent elements. Each constituent element may be realized by a program executing unit such as a Central Processing Unit (CPU) or a processor reading out and executing a software program recorded into a recording medium such as a hard disk or semiconductor memory. Here, the program that realizes each device and the like of the above-described embodiments causes a computer to execute each step of the flowchart illustrated in either of FIGS. 2 and 4.

Note that the present disclosure is also inclusive of the following cases.

(1) At least one of the above-described devices is specifically a computer system constituted by a microprocessor, ROM (Read Only Memory), RAM (Random Access Memory), a hard disk unit, a display unit, a keyboard, a mouse, and the like. A computer program is stored in the RAM or hard disk unit. The at least one of the above-described devices realizes the functions thereof by the microprocessor operating in accordance with the computer program. Here, the computer program is constituted by a combination of a plurality of command codes that indicate commands made to a computer to achieve a predetermined function.

(2) Some or all of the constituent elements constituting at least one of the above-described devices may be constituted by a single system LSI (Large Scale Integration) circuit. "System LSI" refers to very-large-scale integration in which multiple constituent elements are integrated on a single chip, and specifically, refers to a computer system configured including a microprocessor, ROM, RAM, and the like. A computer program is stored in the RAM. The system LSI circuit realizes the functions thereof by the microprocessor operating in accordance with the computer program.

(3) Some or all of the constituent elements constituting at least one of the above-described devices may be constituted by IC cards or stand-alone modules that can be removed from and mounted in the device. The IC card or module is a computer system constituted by a microprocessor, ROM, RAM, and the like. The IC card or module may include the above very-large-scale integration LSI circuit. The IC card or module realizes the functions thereof by the microprocessor operating in accordance with the computer program. The IC card or module may be tamper-resistant.

(4) The present disclosure may be realized by the methods described above. This may be a computer program that implements these methods on a computer, or a digital signal constituting the computer program.

Additionally, the present disclosure may also be computer programs or digital signals recorded in a non-transitory computer-readable recording medium such as a flexible disk, a hard disk, a CD (Compact Disc)-ROM, a DVD, a DVD-ROM, a DVD-RAM, a BD (Blu-ray (registered trademark) Disc), semiconductor memory, or the like. The constituent elements may also be the digital signals recorded in such a recording medium.

Additionally, the present disclosure may be realized by transmitting the computer program or digital signal via a telecommunication line, a wireless or wired communication line, a network such as the Internet, a data broadcast, or the like.

Additionally, the present disclosure may be implemented by another independent computer system, by recording the program or the digital signal in the recording medium and transferring the recording medium, or by transferring the program or the digital signal over the network or the like.

While various embodiments have been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings and claims are incorporated herein by reference in their entirety: Japanese Patent Application No. 2021-049100 filed on Mar. 23, 2021.

INDUSTRIAL APPLICABILITY

The present disclosure can be used in devices that control a headlight in a vehicle capable of switching between autonomous driving and manual driving, for example.

The invention claimed is:

1. A control method that controls a light transmission state of a headlight, the headlight provided in a vehicle, the vehicle capable of driving autonomously and of being driven manually, the control method comprising:
    obtaining target attributes and position information indicating a target position where a target object is present;
    determining whether the vehicle is driving autonomously or is being driven manually;
    determining whether the position information is reliable;
    only when both the vehicle is determined to be being driven manually and the position information is determined to be reliable, inspecting whether the target position is located within a predetermined region of a travel route of the vehicle based on the position information;
    when the target position is located within the predetermined region, changing the light transmission state of the headlight from a first state to a second state;
    when at least one of the vehicle is determined to be driving autonomously or the target position is not located within the predetermined region, maintaining the light transmission state of the headlight; and
    maintaining the light transmission state of the headlight when the vehicle is determined to be being driven manually and the position information is determined to be unreliable.

2. The control method according to claim 1, wherein the determining whether the position information is reliable is performed in response to a determination that the vehicle is being driven manually.

3. The control method according to claim 2, wherein the target attributes includes type information indicating a type of the target object and motion information indicating motion characteristics of the target object, and
    the determining whether the position information is reliable is made by comparing the obtained motion information with motion information set for the type of the target object.

4. The control method according to claim 3, wherein the motion information includes a speed of the target object,
    the position information is determined to be unreliable when a difference between the obtained speed of the target object and a speed set for the type of the target object is equal to or greater than a predetermined threshold, and
    the position information is determined to be reliable when the difference between the obtained speed of the target object and the speed set for the type of the target object is less than the predetermined threshold.

5. The control method according to claim 1, wherein control of the light transmission state includes control of at least one of a light intensity or a region in which light transmitted by the headlight is emitted.

6. The control method according to claim 1, wherein the target attributes include type information indicating a type of the target object and motion information indicating motion characteristics of the target object, and
    the determining whether the position information is reliable is made by comparing the obtained motion information with motion information set for the type of the target object.

7. The control method according to claim 6, wherein the motion information includes a speed of the target object,
    the position information is determined to be unreliable when a difference between the obtained speed of the target object and a speed set for the type of the target object is equal to or greater than a predetermined threshold, and
    the position information is determined to be reliable when the difference between the obtained speed of the target object and the speed set for the type of the target object is less than the predetermined threshold.

8. A control device that controls a light transmission state of a headlight, the headlight provided in a vehicle, the vehicle capable of driving autonomously and of being driven manually, the control device comprising:
    at least one memory; and
    circuitry,
    wherein, using the at least one memory, the circuitry:
        obtains target attributes and position information indicating a target position where a target object is present;
        determines whether the vehicle is driving autonomously or is being driven manually;
        determines whether the position information is reliable;
        only when both the vehicle is determined to be being driven manually and the position information is determined to be reliable, inspects whether the target position is located within a predetermined region of a travel route of the vehicle based on the position information;
        when the target position is located within the predetermined region, changes the light transmission state of the headlight from a first state to a second state;
        when at least one of the vehicle is determined to be driving autonomously or the target position is not located within the predetermined region, maintains the light transmission state of the headlight; and
        maintains the light transmission state of the headlight when the vehicle is determined to be being driven manually and the position information is determined to be unreliable.

* * * * *